US009275476B1

(12) United States Patent
Killalea et al.

(10) Patent No.: US 9,275,476 B1
(45) Date of Patent: Mar. 1, 2016

(54) MULTI-WAY AND MULTI-THREAD CONVERSATION SYSTEM

(75) Inventors: Tom Killalea, Seattle, WA (US); Hanning Zhou, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 280 days.

(21) Appl. No.: 13/534,887

(22) Filed: Jun. 27, 2012

(51) Int. Cl.
*G09G 5/00* (2006.01)
*G06T 11/00* (2006.01)
*G06F 3/14* (2006.01)

(52) U.S. Cl.
CPC .............. *G06T 11/001* (2013.01); *G06F 3/14* (2013.01)

(58) Field of Classification Search
None
See application file for complete search history.

(56) References Cited

U.S. PATENT DOCUMENTS

| | | | | |
|---|---|---|---|---|
| 2009/0083261 | A1* | 3/2009 | Nagano et al. | 707/5 |
| 2011/0320373 | A1* | 12/2011 | Lee et al. | 705/319 |
| 2012/0150997 | A1* | 6/2012 | McClements, IV | 709/217 |
| 2013/0021370 | A1* | 1/2013 | Dunn et al. | 345/629 |
| 2013/0091419 | A1* | 4/2013 | Caliman et al. | 715/236 |
| 2013/0097481 | A1* | 4/2013 | Kotler et al. | 715/230 |

* cited by examiner

*Primary Examiner* — James A Thompson
*Assistant Examiner* — Xilin Guo
(74) *Attorney, Agent, or Firm* — Lowenstein Sandler LLP

(57) ABSTRACT

A conversation management module receives user selections of sections in a digital media item from one or more users. The conversation management module also receives one or more comments associated with the selected sections. The conversation management module displays or provides conversation windows in a first portion of an interface, where each window associated with a selected section and displays comments associated with the selected section in the corresponding conversation window. The conversation management module also provides a list of users in a second portion of the interface and a list of keywords which appear in the comments in a third portion of the interface.

21 Claims, 10 Drawing Sheets

MULTI-WAY AND MULTI-THREAD CONVERSATION SYSTEM

BACKGROUND

A large and growing population of users enjoys entertainment through the consumption of media items, including electronic media, such as electronic books (also referred to herein as ebooks), electronic newspapers, electronic magazines and other electronic reading material. Users employ various electronic devices to consume such publications. Among these electronic devices are electronic book readers, cellular telephones, personal digital assistants (PDAs), portable media players, tablet computers, electronic pads, netbooks, desktop computers, notebook computers and the like.

Users may wish to interact with an author of an electronic media item, such as an author of an electronic book or with other users to discuss the electronic media item. For example, a user may wish to have a question and answer (Q&A) session with the author to better understand an author's thoughts, impressions, opinions, interpretations, etc. A user may also wish to discuss certain portions of an electronic media item (such as an electronic book) with the author or other users. For example, a user may wish to discuss a particular chapter, passage, paragraph, or sentence in an electronic book.

Generally, a user attends a live Q&A session (e.g., a book tour, a book signing, or a book reading) which is conducted by an author in order to interact with the author. The author may conduct the Q&A sessions in order to promote a book or electronic book. These Q&A sessions are generally held at specific locations and at specific times. In addition, a user may attend a gathering with other uses (e.g., attend a book club) to discuss an electronic media item, such as an electronic book.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

The following description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for an interface which provides a multi-way (e.g., multi-user) and multi-threaded (e.g., multiple topics, comments, or conversations) conversation system for discussing electronic media items. In one embodiment, a conversation management module may provide an interface which includes a first portion, a second portion and a third portion. The first portion may provide the content of an electronic media item (e.g., text, pictures, etc. of a book). The conversation management module may receive user selections of sections of the content and may receive comments from users associated with the selected sections. The conversation management module may provide multiple conversation windows in the first portion associated with the selected sections and may provide the user's comments in the conversation windows.

The conversation management module may display icons next to the conversation windows (to indicate the existence of a conversation window) and may allow users to minimize or reduce the size of the conversation windows. The conversation management module may also display a list of users in a second section of the interface and may allow users to select one or more users and sort the users based on one or more criteria. The conversation management module also displays keywords which are used in the comments provided by the users, in the third portion of the interface. The keywords may be connected by lines or edges, if the conversation management module determines that the keywords are associated with each other.

Figure 1:
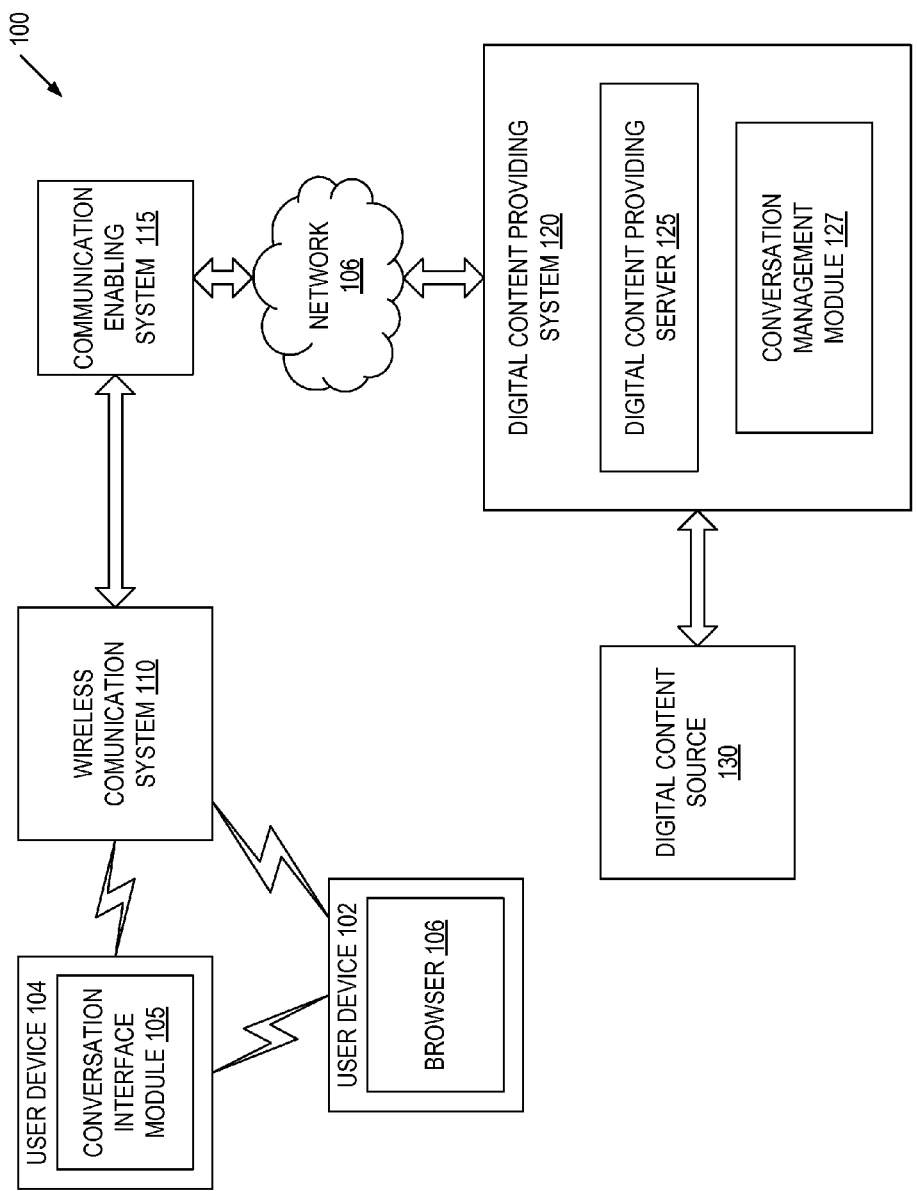
FIG. 1 is a block diagram of an exemplary network architecture, in which embodiments of the present invention may operate.

FIG. 1 is a block diagram of an exemplary network architecture 100, in which embodiments of the present invention described herein may operate. The network architecture 100 may include a digital content providing system 120 and one or more user devices 102, 104 capable of communicating with the digital content providing system 120 via a network 106. Network 106 may include, for example, a public network such as the Internet or a private network such as a local area network (LAN).

The user devices 102, 104 may be portable computing devices such as electronic book readers or tablet computers (e.g., that include a book reader application). Other examples of portable computing devices include cellular telephones, personal digital assistants (PDAs), portable media players, netbooks and the like. The user devices 102, 104 may also be non-portable computing devices such as a desktop computer, a set-top box associated with a television, a gaming console and so on. The user devices 102, 104 are variously configured with different features to enable consumption of one or more types of digital content and electronic media items. The digital content and electronic media items may include electronic books (ebooks) such as electronic textbooks and/or other electronic publications (electronic versions of publications) such as electronic magazines, digital newspapers, digital audio books, electronic journals, real simple syndication (RSS) feeds, etc. The media items may also include digital video (e.g., movies, television, short clips, etc.), images (e.g., art, photographs, etc.), audio files and multi-media content.

The digital content providing system 120 may correspond to any feature or combination of features for providing electronic media items or other digital content to the user devices 102, 104. The digital content providing system 120 may include a network-accessible server-based functionality (digital content providing server 125), various data stores (not shown) and/or other data processing equipment. The digital content providing system 120 may be implemented by a single machine or a cluster of machines. The digital content providing system 120 may include one or more machines (e.g., one or more server computer systems, routers, gateways, etc.) that have processing and storage capabilities to provide the server-based functionality.

In one embodiment, the digital content providing server 125 corresponds to an entity which provides electronic media items (e.g., electronic books) to users upon the users' purchase of the items. In this role, the digital content providing server 125 may essentially act as a bookseller or the like. In other cases, the digital content providing server 125 corresponds to an entity which provides electronic media items to users on a non-fee basis or on the basis of some other type of alternative compensation arrangement. Thus, the term a "provider" of items should be construed broadly to encompass educational institutions, governmental organizations, libraries, non-profit organizations, retailers, auction services and so on, or some cooperative combination of any two or more entities.

The digital content providing server 125 may deliver and the user devices 102, 104 receive, electronic media items (or other media items), search results, upgrades and/or other information via the network 106. For example, the user devices 102, 104 may download or receive ebooks from the digital content providing server 125. The digital content providing server 125 may also receive various requests (e.g., search queries), instructions and other data from the user devices 102, 104 via the network 106.

Communication between the user devices 102, 104 and the item providing system 120 may be enabled via any communication infrastructure. One example of such an infrastructure includes a combination of a wide area network (WAN) and wireless infrastructure, which allows a user to use the user devices 102, 104 to purchase digital content (e.g., electronic media items) and consume the digital content without being tethered to the digital content providing system 120 via hardwired links. The wireless infrastructure may be provided by one or multiple wireless communications systems, such as wireless communication system 110. In one embodiment, wireless communication system 110 may be a wireless fidelity (WiFi) hotspot connected with the network 106. Wireless communication system 110 may also be a wireless carrier system that can be implemented using various data processing equipment, communication towers, etc. Alternatively, or in addition, the wireless carrier system may rely on satellite technology to exchange information with the user devices 102, 104.

The communication infrastructure may also include a communication-enabling system 115 that serves as an intermediary in passing information between the digital content providing system 120 and the wireless communication system 110. The communication-enabling system 115 may communicate with the wireless communication system 110 (e.g., a wireless carrier) via a dedicated channel and may communicate with the digital content providing system 120 via a non-dedicated communication mechanism, (e.g., a public Wide Area Network (WAN) such as the Internet).

In addition to wirelessly connecting to wireless communication system 110, user devices 102, 104 may also wirelessly connect to other user devices 102, 104. For example, user device 102 may form a wireless ad hoc (peer-to-peer) network with user device 104 using WiFi, Bluetooth, or other wireless communication protocols.

In one embodiment, digital content providing server 125 may include conversation management module 127. The conversation management module 127 may provide an interface or display which allows users (e.g., readers, an author, a publisher, etc.) to interact with each other (via the interface) to discuss an electronic media item (e.g., an electronic book). The conversation management module 127 may provide the content of an electronic media item, such as an electronic book, to one or more users in a first portion of a display. For example, the conversation module 127 may provide the content (e.g., text, images, graphs, etc.) of a book to users via a first portion of a web interface or other graphical user interface (GUI). The content of the electronic media item (e.g., text, images, graphs, etc.) may be resized based on a user input. For example, the user may provide a user input (e.g., a mouse click, touch screen gesture, keyboard input, etc.) to indicate that the font size of text (e.g., content) in the electronic media item should be increased. The conversation management module 127 may increase the text size of and may re-distribute the content in pages which are provided in the first portion of the interface or display. For example, when the font size is increase, fewer words may fit on a page of the content. The conversation management module 127 may "reflow" or reorganize the content to accommodate the change in font size (e.g., may change the number of words which may appear on each page and may add or delete pages to accommodate the change).

In one embodiment, the conversation management module 127 may receive user selections of portions or sections of the content (e.g., a user may highlight a portion or section of the content). For example, the conversation management module 127 may receive a user selection of a word, sentence, paragraph, page, chapter, etc. The conversation management module 127 may also receive comments associated with the selected sections (e.g., highlighted portions or sections) of the content. For example, multiple users may provide comments associated with a certain passage in an electronic book.

In one embodiment, the conversation management module 127 provides conversations windows which are associated with selected sections of the content. For example, each conversation window may be associated with a selected section of the content. The conversation windows may contain comments from one or more users which are related to the selected sections of the comment. For example, users may comment on a section an electronic book. The conversation management module 127 may receive their comments and may display their comments in a conversation window (which is associated with the section). In one embodiment, the conversation management module 127 may provide multiple conversation windows (associated with multiple sections of the book) which contain multiple comments from multiple users. For example, the conversation management module 127 may provide three conversation windows, each associated with a different section of a book and each conversation window containing comments from different users associated with the corresponding section of the book.

In one embodiment, the conversation management module 127 may allow users to change the size of one or more conversation windows. For example, if a user is not interested in a particular section, the user may provide user input (e.g., a mouse click, touch screen gesture, keyboard input, etc.) to minimize or reduce the size of the conversation windows. The conversation management module 127 may also allow a user to scroll through a conversation window. For example, if the conversation window has a fixed length and many users have provided comments, the conversation management module 127 may provide a scroll bar on the side of the conversation window to allow a user to view all of the comments provided by the users.

In one embodiment, the conversation management module 127 may also provide a list of users in a second portion of a display or interface. For example, the list of users may be a list of all users who have provided one or more comments for one or more sections of the content. The conversation management module 127 may allow users to sort the list of users using one or more criteria. For example, the list may be sorted by the number of comments provided. In another example, the list may be sorted by a rank of the user (e.g., a rank based on input received from other users). In a further example, the list may be sorted by the comments provided for the users (e.g., the list may be sorted by users who provided positive comments or by users who provided negative comments). In yet another example, the list may be sorted by the seniority of the users (e.g., sorted by the length of time a user account has been in use, such as by oldest users first or newest users first).

In one embodiment, the conversation management module 127 may allow a user to select one or more users from the list of users displayed in the second portion of the display or interface. For example, the conversation module 127 may provide check boxes or radio buttons next to each user in the list of users. The conversation windows may be provided or displayed based on the users which are selected. For example, the conversation management module 127 may provide or display conversation windows where one or more of the users selected from the list of users, have provided comments. In another embodiment, the conversation management module 127 may minimize or reduce the size of conversation windows which do not contain comments from the users selected from the list of users.

In one embodiment, the conversation management module 127 may provide keywords or key phrases from one or more of the conversation windows in a third portion of the display or interface. For example, as users discuss sections of the electronic media item (e.g., a paragraph from an electronic book), the conversation management module 127 may determine which words are used in the discussions (e.g., which words are used in the user's comments). In another example, the conversation management module 127 may determine one or more topics or subjects of a conversation window and may determine that the one or more topics or subjects are keywords or key phrases which may be displayed in the third portion of the display or interface. The conversation management module 127 may obtain certain keywords or key phrases which have been provided by users and may provide those keywords or key phrases in the third portion of the display or interface. The keywords or key phrases may be connected by one or more lines or edges. The edges may indicate that the keywords or key phrases connected by the lines or edges are related or associated with each other. In another embodiment, the size of a keyword or phrase may be related to the significance of the keyword or phrase. For example, a keyword or phrase which appears in one or conversation windows and also appears in the content of the electronic media item, may be considered more significant and may be displayed using a larger font, or may be formatted differently (e.g., may be bolded, underlined, displayed in a box, etc.). In one embodiment, the each keyword may be associated with a keyword metric (e.g., a number, text, an icon, etc.). The keyword metric may be a number or other value (e.g., such as text) and may indicate the number of times a keyword has been used in conversation windows, the number of times a keyword appears in the content of the electronic media item, or the number of times a keyword has been selected (e.g., clicked on by a user). The keyword metric may be displayed in the third portion of the display or interface, along with the keywords. For example, the keyword metric may be displayed as a number next to, underneath, or above a keyword. The keyword metric may allow users to determine which topics are discussed the most (e.g., which topics are most popular). In one embodiment, the keyword metric may be a relationship between a keyword and one or more of the content of the digital media item and the content of the conversation windows. The relationship between a keyword and the content of the digital media item or conversation windows may indicate how popular the keyword is in the digital media item or in the conversation windows (e.g., how often a keyword appears or is used by a user). In one embodiment, each keyword may have a display characteristic associated with the keyword. The display characteristic may be one or more of the background color of the keyword (e.g., highlighting), the text color of the keyword (e.g., the color of the text), the size of the keyword, or the formatting of the keyword (e.g., bold, underline, italics, etc.). The display characteristics of a keyword may be based on the keyword metric associated with the keyword or may be based on the relationship between the keyword and the content of the digital media item or the content of the conversation windows. For example, keywords with keyword metric greater than a threshold may be highlighted red. In another example, keyword with a keyword metric lower than a threshold may be smaller in size. In a further example, a keyword with a keyword metric having a certain value may be formatted with bolding and underlining.

In one embodiment, a user may select a keyword from the third portion of the display or interface. When the user selects a keyword, conversation windows which are associated with the keyword (e.g., conversation windows that contain the keyword or that have a topic or subject related to the keyword) may be highlighted (e.g., the conversation window may be highlighted with a particular color). Highlighting conversation windows associated with a keyword may allow a user to identify which conversation windows the user may be interested in (e.g., to identify which conversation windows are related or associated with the keyword the user is interested in). In other embodiments, when a user selects a keyword, the conversation windows that are associated with the keyword may flash (e.g., blink) or may be outlined (e.g., the borders of the conversation windows are outlined in a different color or outlined with a thicker line, etc.).

In one embodiment, the conversation management module 127 may analyze the words in the one or more conversation windows using a variety of techniques or methods to determine whether the words should be displayed as keywords or key phrases. For example, the conversation management module 127 may use statistical probability analysis, may count the number of occurrences of the words in the comments and the content, may use an artificial intelligence engine, may access a database or dictionary of possible keywords, etc. In another example, the conversation management module 127 may determine whether the words used in the one or more conversation windows are also in the content of the electronic media item and may identify words which appear in at least one conversation window and appear in the content, as keywords. In one embodiment, the keywords may be topics or subjects of the conversation windows. For example, although the keyword may not appear in the conversation windows, the keyword may be a subject which is discussed by one or more users in the conversation window. In another embodiment, the conversation management module 127 may determine whether keywords are related to each other and may indicate that two keywords are related or associated with each other by providing a line or edge between the two keywords.

In one embodiment, the conversation management module 127 may reside on a server, such as a web server (e.g., a server which hosts a website, web portal, or web interface). The conversation management module 127 may provide the display or interface to the user through a browser 106 executing on the user device 102. The different portions of the display or interface may be rendered by the browser 102 on the user device 104. In one embodiment, the conversation management module 127 may provide or more of hypertext markup language (HTML) code, dynamic HTML (DHTML) code, JavaScript code, stylesheets (e.g., cascading style sheets (CSS)), extensible markup language (XML) code, a Flash program or module, or other types of web-based code, modules, or languages to the browser 106 executing on the user device 102. The browser may render this code or language on a display in the user device 102.

The browser 106 may receive user input and may provide this user input to the conversation management module 127. For example, the browser 106 may receive a user's selection of a section of the content presented by the browser and may receive comment associated with the section from the user. The browser 106 may provide the user's selection and comment to the conversation management module 127 and the conversation management module 127 may update the interface or display to reflect the user's selection and comment (e.g., may add this comment to an existing conversation window or may create a new conversation window). This update may be provided to different user devices (e.g., user device 104) such that the different user devices are provided with the updated selection and comment.

In another embodiment, the conversation management module 127 may be an application which resides on a server. The conversation management module 127 may provide data (e.g., comments received from users, the content of the electronic media item, data indicative of the selected sections of the content, the list of users, the list of keywords and the connections between the keywords) to a client module, such as the conversation interface module 105 on the user device 104.

The user device 104 may include a conversation interface module 105. In one embodiment, the conversation interface module 105 may be an application, module, hardware, software, or any combination thereof, which executes on the user device 104. The conversation interface module 105 may receive data from the conversation management module 127 or from a server and may render a display or interface which includes a first portion (to display the content of an electronic media item, the selected sections of the content and conversation windows), a second portion (to display a list of users) and a third portion (to display keywords or key phrases), based on the data received from the conversation management module 127 or the server. For example, the conversation interface module 105 may receive data from the conversation management module 127 which includes a list of users, comments from the users, the conversation windows and sections of the content associated with the comments and a list of keywords. The conversation interface module 105 may render one or more conversation windows which include the comments, a list of the users along with icons associated with the users and a view of the keywords, based on the data received from the conversation management module 127. The conversation interface module 105 may also receive user input from a user (e.g., receive a user selection and a comment associated with the user selection) and may provide the user input to the conversation management module 127.

In one embodiment, the conversation management module 127 may provide a system or an interface for allowing users (and authors) to discuss an electronic media item, such as a book. The conversation management module 127 allows users to interact with each other to discuss the electronic media item and allows users to discuss precise sections of the electronic media item. The conversation management module 127 may also allow an author (who may also be a user) to directly interact with readers of the author's book. The users and the author may use the conversation management module 127 to promote interest in an electronic media item or to update the electronic media item (e.g., provide more details or information) without release a new version of the electronic media item. In one embodiment, conversation management module 127 may enrich the user experience of purchasing, viewing and discussing electronic media items.

Figure 2:
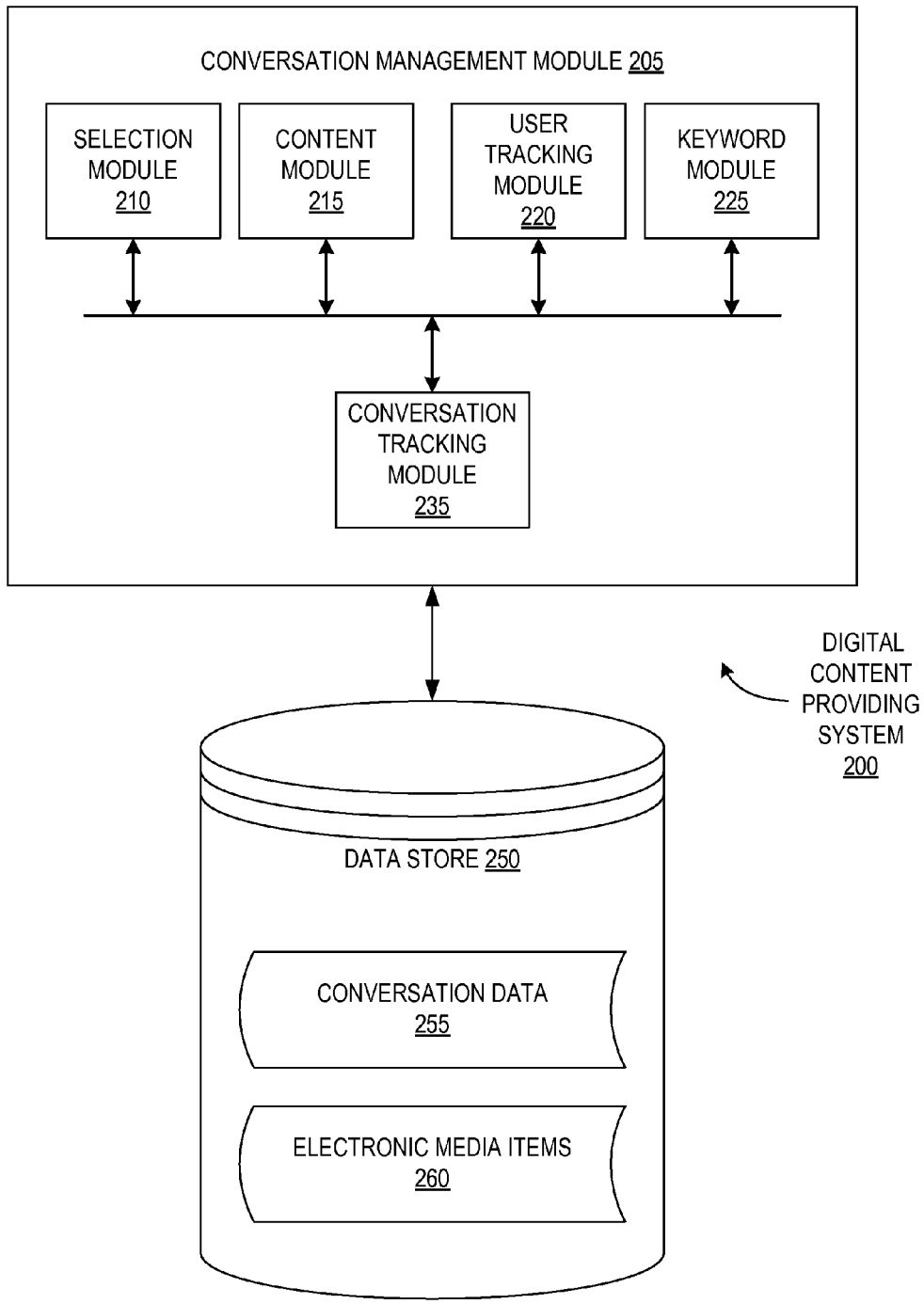
FIG. 2 is a block diagram illustrating a conversation management module, according to an embodiment.

FIG. 2 is a block diagram of one embodiment of a conversation management module 205 that may be included in a digital content providing system 200 (e.g., digital content providing server 120 of FIG. 1). In one embodiment, digital content providing system 200 includes conversation management module 205, which may include a selection module 201, a content module 215, a user tracking module 220, a keyword module 225 and a conversation tracking module 235. As discussed above, the conversation management module 205 may provide an interface or a display which includes a first portion, a second portion and a third portion. In one embodiment, conversation management module 205 is connected to a data store 250, which may be a file system, database or other data management layer resident on a data storage device such as a disk drive, RAM, ROM, database, etc. Data store 250 may include conversation data 255 and one or more electronic media items 260.

In one embodiment, the content module 215 may provide the content of the electronic media item 260 to the user in the first portion of the display. For example, the content module 215 may display the text, images, charts, graphs, equations, etc., of an electronic book in the first portion of the display. The content module 215 may obtain the content of the electronic media item 260 from the data store 250. The content module 215 may also resize, reflow, reorganize, or adjust, etc., the content based on user input. For example, a user input to increase the font size may be received and the content module 215 may adjust the number of words which appear per page, based on the user input. The content module 215 may also add more pages in order to display the content, because fewer words may be displayed per page due to the increase on font size.

In one embodiment, the selection module 210 may process input indicating a selection of section of the content of an electronic media item (e.g., a selection of a word, line, paragraph, chapter, an image, a graph, a chart, etc.) received from a user. The selection module 210 may also highlight the section of content selected by the user. In another embodiment, the selection module 210 may highlight different sections (which have been selected by one or more users) using different colors, so that users may differentiate between the different selected sections. In one embodiment, if a user selects a section which is identical to a previously selected section (e.g., a user selects a previously selected sentence or word) the selection module 210 may not re-highlight that section. In one embodiment, the selection module 210 may store data associated with the selected sections (e.g., may store data indicating which sections of the content were selected or highlighted by users) as part of the conversation data 255 of the data store 250.

In one embodiment, the conversation tracking module 235 may receive user comments associated with selected sections of the content selected by one or more users. For example, the conversation tracking module 235 may receive a user comment about a certain sentence in the content selected by the user. The selection module 210 may highlight that sentence in the first portion of the display and the conversation tracking module 235 may provide a conversation window and associate the conversation with the selected section of the content (e.g., may associated the conversation window with the highlighted section). The conversation tracking module 235 may also receive a second comment associated with the selected section of the content and the conversation tracking module 235 may provide the second comment in the conversation window. The conversation tracking module 235 may further provide multiple conversation windows, each conversation window associated with a different section of the content and each conversation window containing comments from one or more users. In another embodiment, the conversation tracking module 235 may store one or more conversations (e.g., the comments in a conversation window), in the conversation data 255 of the data store 250.

In one embodiment, the user tracking module 220 may track or determine which users have selected sections of the content and provided comments on the selected sections (e.g., may maintain a list of users who have commented on sections of the content). The user tracking module 220 may also provide a list of users in a second portion of the display or interface provided by the conversation management module 205. The user tracking module 220 may also sort a list of users based on one or more criteria. For example, the user tracking module 220 may determine a number comments provided by each user and may sort the list of users based on the number of comments provided by each user (e.g., users are sorted in order of most comments provided). In another example, the user tacking module 220 may determine a rank for a user based on feedback about the user received from other users (e.g., based on how other users have ranked this user). The user tracking module 220 may sort the list of users form highest ranked to lowest ranked, or vice versa. The user tracking module 220 may also receive user input selecting one or more users from the list of users and may provide the selected users to the conversation tracking module 235 to enable the conversation tracking module 235 to minimize or display conversation windows, based on the selected users.

In one embodiment, the keyword module 225 may analyze one or more conversation windows (e.g., one or more conversations) and may determine whether words in the conversation windows (e.g., words in the comments provided by users) are keywords or key phrases. As discussed above, the keyword module 225 may use a variety of techniques or methods to identify keywords or key phrases. For example, the keyword module 225 may use a dictionary or database to identify keywords or key phrases. In another example, the keyword module 225 may analyze the content to determine whether words in the conversation windows also appear in the content, to identify keywords or key phrases. The keyword module 225 may provide a list of keywords or key phrases which are displayed in a third portion of the display or interface. The keywords or key phrases may be connected by lines or edges, based on whether the keywords or key phrases are associated or related with each other. The keyword module 225 may also determine whether keywords or key phrases are associated with each other and may provide or display the lines or edges to indicate that keywords or key phrases are associated with each other.

In one embodiment, the conversation data 255 may include data such as the comments provided by the users in the conversation windows (e.g., a copy of the comments provided by users) and data to indicate which sections of the content are associated with the conversation windows or comments. The conversation data 255 may store these conversations and selected (e.g., highlighted) portions of text so that the conversations and selected portions of text may be accessed at a later time. The conversation data 255 may allow users to discontinue or pause a conversation and resume a conversation at a later time. For example an author or a user may have an appointment and may not be able to continue commenting on a section of a book. Because the conversation data 255 is stored (e.g., because selected portions and their associated comments and conversation windows are stored), the user may come back at a later time (e.g., after the appointment) and may resume commenting on the content.

Additional details of conversation management module 205 and the display or interface are discussed below with respect to FIGS. 2-9.

Figure 3:
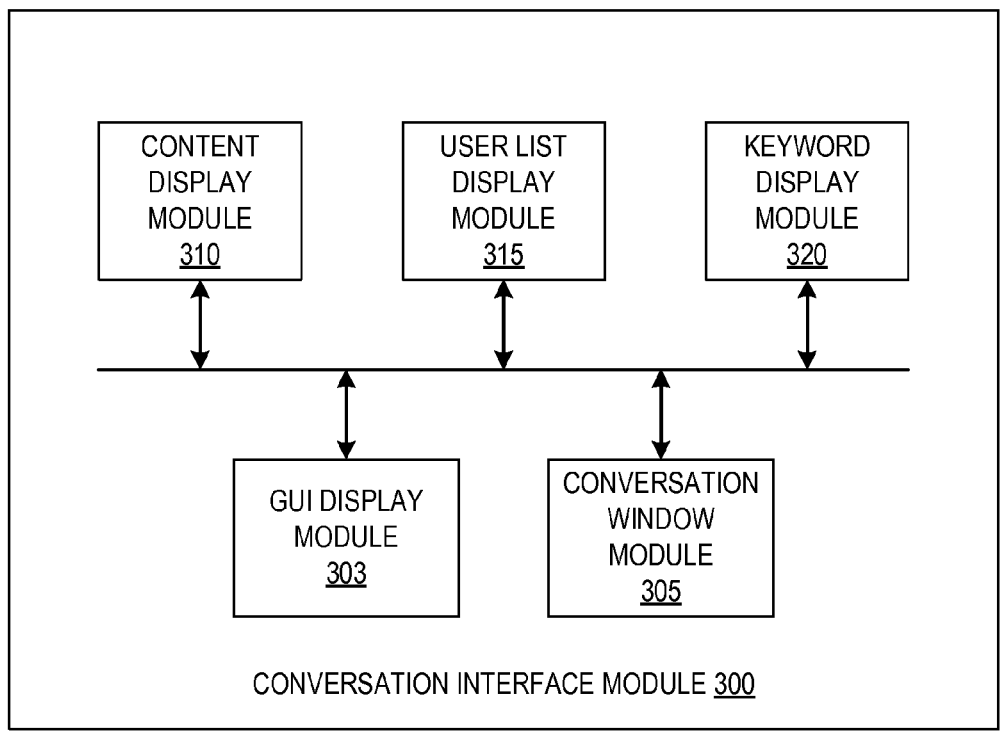
FIG. 3 is a block diagram illustrating conversation interface module, according to one embodiment.

FIG. 3 is a block diagram illustrating a conversation interface module 300, according to one embodiment. In one embodiment, the conversation interface module 300 may reside or execute on a user device (e.g., user device 104 of FIG. 1). The conversation interface module 300 may provide a graphical user interface (GUI) or some other interface which allows a user to view content of a electronic media item (e.g., view an electronic book), select and comment on sections of the content (e.g., select a sentence, image, graph, etc. and provide a comment), to view a list of users who have provided comments on sections of the content and to view keywords or key phrases used in the comments provided by the user or provided by other uses. The conversation interface module 300 includes a GUI display module 303, a conversation window module 305, a content display module 310, a user list display module 315 and a keyword display module 320.

In one embodiment, the GUI display module 303 may provide a GUI or a display to a user. As discussed above, the GUI or display may include a first portion (to display the content of an electronic media item, the selected sections of the content and conversation windows), a second portion (to display a list of users) and a third portion (to display keywords or key phrases). The GUI display module 303 may render or display the GUI or display to a user via a screen or other output device (e.g., a liquid crystal display (LCD), a touch screen, a monitor, etc.).

In one embodiment, the conversation window module 305 may receive data associated with selection portions of content (e.g., selected words, paragraphs, etc., in a digital book) and comments associated with the selected portions of content, from a conversation management module (e.g., conversation management module 127 of FIG. 1). The conversation window module 305 may highlight the selected portions of content and may provide or display conversation windows containing comments associated with the selected (e.g., highlighted) portions of content, in the first portion of the GUI or display. The conversation window module 305 may also receive user input (e.g., receive a user comment) associated with a selected portion of content. For example, a user may select a conversation window and may provide a comment or reply to another comment in the conversation window. The conversation window module 305 may provide the user's comment to the conversation management module so that the conversation management module can provide the user's comment to other user devices.

In one embodiment, the content display module 310 may display the content of an electronic media item (e.g., may display the text, images, charts, graphs, tables, etc., of a book or electronic book) in the first portion of the GUI or display. The content display module 310 may receive the content (e.g., may receive the electronic media item) from the conversation management module or from a digital content providing server. In another embodiment, the user list display module 315 may receive a list of users who have provided comments on the content of an electronic media item from the conversation management module and may provide or display the list of users in the second portion of the GUI or display. The user list display module 315 may also receive a user selection of one or more of the users in the list of users and may cause the conversation window module 305 to minimize or reduce the size of one or more conversation windows, based on the user selection of one or more of the users. In one embodiment, the keyword display module 320 may provide (e.g., display) keywords or key phrases used in the comments and associates between the keywords or key phrases (e.g., lines between the keywords or key phrases) in a third portion of the GUI or display. The keyword display module 320 may receive the list of keywords or key phrases and the associations between the keywords or key phrases from the conversation management module.

Figure 4:
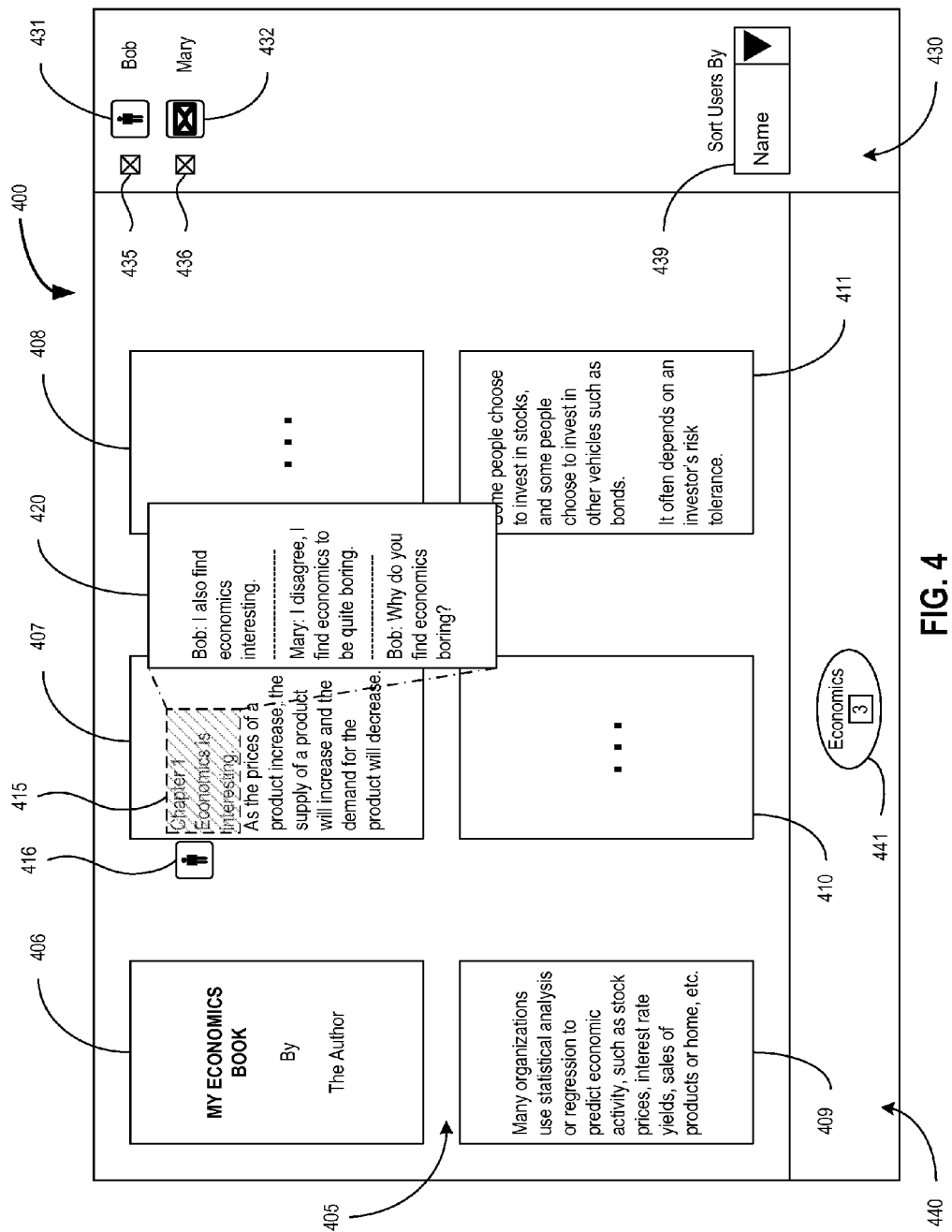
FIG. 4 is a diagram illustrating a user interface according to one embodiment.

FIG. 4 is a diagram illustrating a user interface 400 according to one embodiment. The user interface 400 includes a first portion 405, a second portion 430 and a third portion 440. In one embodiment, the user interface 400 may be provided by a conversation management module or server and may be displayed by a browser (e.g., a web browser) on a user device. In another embodiment, the user interface 400 may be provided or displayed by an application or module (e.g., a conversation interface module) on a user device and the data presented in the user interface 400 may be received from a conversation management module or server.

The first portion 405 includes pages 406, 407, 408, 409, 410 and 411. The pages 406, 407, 408, 409, 410 and 411 include the content (e.g., text, images, graphs, etc.) of an electronic media item (e.g., a book or electronic book). For example, page 406 includes the title page which indicates the title of the book (e.g., "My Economics Book") and the author or the book (e.g., "Author"). Pages 407 through 411 include text, images, graphs, etc., in the book. In one embodiment, the content may be scanned images of a physical book which are processed using optical character recognition (OCR) techniques to identify words, phrases, etc. in the scanned images. It should be noted that pages 408 and 410 are shown as containing "..." to indicate that one or more of text, images, graphs, charts, tables, etc., may be in the pages 408 and 410, although they are not shown in the pages 408 and 410. The first portion 405 may include a scroll bar to allow a user to scroll to other pages which include content. For example, the first portion 405 may contain tens or hundreds of pages, but the first portion may only provide six pages at a time. A scroll bar may be used to scroll to the other pages which are not initially provided in the first portion 405.

A section 415 of the content is selected by the user "Bob." The section 415 may be highlighted to indicate that Bob has selected the section 415 and provided one or more comments associated with the section 415. As discussed above, the section 415 may be highlighted in a particular color (e.g., red, blue, green, etc.). The comments associated with section 415 are contained in a conversation window 420. The conversation window 420 is provided when Bob selects the section 415 and provides a comment associated with the section 415 (e.g., "I also find economics interesting."). The conversation window 420 is associated with the highlighted section 415. A conversation management module (e.g., on a server) receives Bob's selection of section 415 and Bob's comment and may provide Bob's selection and comments to other user devices or users (e.g., Mary) by providing the conversation window 420. An icon 416, which is associated with Bob, is provided next to the highlighted section 415 to indicate that Bob initiated the conversation window 420 (e.g., initiated the conversation). In other embodiments, other icons may be provided or displayed next to the highlighted section 415. For example, the icon associated with the user who provides the most comments in the conversation window 420 may be displayed. In another example, the icon for the last user who provided a comment in the conversation window 420 may be displayed. In a further example, the conversation management system may select a different icon from a plurality of icons, for each conversation window, to allow users to differentiate between multiple conversation windows.

The user "Mary" responds to Bob's comments by providing a comment in the conversation window 420 (e.g., "I disagree. I find economics to be quite boring."). For example, Mary may select the conversation window 420 and may type a comment or response (using a keyboard, touch screen, etc.). Mary's comment is provided to the conversation management module which may provide Mary's comments to other user devices or users (e.g., to Bob) by updating the conversation window 420 to include Mary's comment. Bob response to Mary's comment by providing a second comment in the conversation window 420 (e.g., "Why do you find economics boring?"). Bob's second comment is provided to the conversation management module which may provide Bob's second comment to other user devices or users (e.g., to Mary) by updating the conversation window 420 to include Bob's second comment.

The second portion 430 of the user interface 400 includes a list of users who have provided comments on highlighted sections of content, displayed in the first portion 405. As shown in FIG. 4, the users Bob and Mary have provided comments to section 415 of the content and are displayed in the list of users in portion 405. An icon 431 is displayed in the second portion 430 and the icon 431 is associated with the user Bob. An icon 432 is also displayed in the section portion 430 and the icon 431 is associated with the user Mary. In one embodiment, the icon 431 may be identical to the icon 416 (which is used to identify the conversation window 420). In another embodiment, the icon 416 may be different from the icon 431. The check boxes 435 and 436 (which correspond to the user Bob and Mary respectively) are selected, indicating that conversation windows which contain comments from Bob or Mary should be displayed in the user interface 400. The second portion 430 also includes a menu 439, which allows the list of users to be sorted based on different criteria (e.g., sort by most active user, sort by name of user, sort by most positive comments, etc.).

The third portion 440 includes a keyword 441 (e.g., "Economics"). The keyword 441 is obtained from the conversation window 420. As discussed above, a variety of techniques or methods may be used to analyze the words in the comments in the conversation window 420 and to identify keywords or phrases. The keyword 441 may be a keyword that appears in at least one of the content and a conversation window (e.g., conversation window 420), or may be a subject or topic in a conversation window (e.g., the topic of conversation windows 420). In one embodiment, when the user selects a keyword, any conversation windows associated with the keyword may be highlighted, outlined, flashed, etc. For example, when the user selects the keyword 441, any conversation windows which include the word "economics" or which discuss the topic of "economics" (e.g., conversation window 420) may be highlighted (e.g., the color of the conversation window 420 may change, the outline of the conversation window 420 may be bolded or colored, etc.).

In one embodiment, the keyword 441 may also include a metric (e.g., a keyword metric or a relationship between the keyword and the content of the digital media item or conversation windows) indicating how popular the keyword 441 is. In one embodiment, the metric may be based on the number of times that users have clicked on the keyword 441. In another embodiment, the metric may be based the number of times the keyword appears in the conversation window 420 (e.g., 3 times). In a further embodiment, the metric may be based on the number of times the keyword appears in the content of the electronic media item. In one embodiment, the metric may be a combination of any number of the above factors (e.g., number of clicks, number of times keyword appears in content, number of times keyword appears in conversation windows, etc.).

Figure 5:
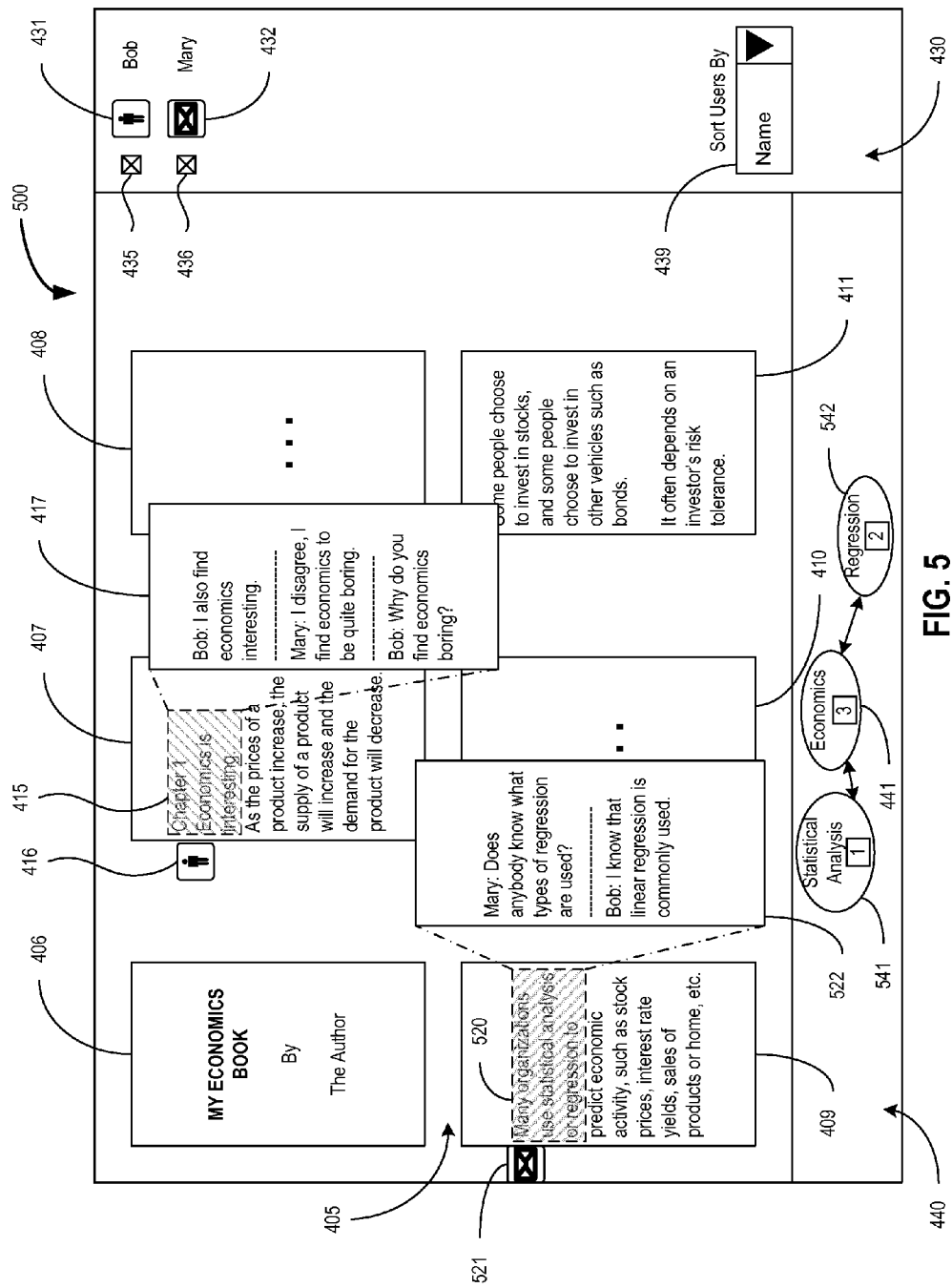
FIG. 5 is a diagram illustrating a user interface according to another embodiment.

FIG. 5 is a diagram illustrating a user interface 500 according to another embodiment. The user interface 500 is similar to the user interface 400 of FIG. 4 and includes a first portion 405, a second portion 430 and a third portion 440. The first portion 405 includes pages 406 through 411. The conversation window 417, which is associated with the highlighted section 415, is displayed in the first portion, as discussed above in conjunction with FIG. 4. Comments associated with the highlighted section 415 and provided by the users Bob and Mary are displayed in the conversation window 417. The icon 416 is also displayed next to the conversation window 417, as discussed above in conjunction with FIG. 4.

In the user interface 500, Mary has selected section 520 of the content of the electronic media item. The section 520 is highlighted as shown in FIG. 5. Mary provides a comment associated with the highlighted section 520, which is received by a conversation management module. The comment provided by Mary (e.g., "Does anybody know what types of regression are used?") is displayed in the conversation window 522, which is associated with the highlighted section 520. Bob responds to Mary's comment by typing a comment or response in the conversation window 522 (e.g., "I know that linear regression is commonly used."). Bob's comment is provided to the conversation management module which may provide Bob's comment to other user devices or users (e.g., to Mary) by updating the conversation window 520 to include Bob's comment.

As discussed above in conjunction with FIG. 4, the second portion 430 of the user interface 400 includes a list of users who have provided comments on highlighted sections of content, displayed in the first portion 405. Icon 431 is displayed in the second portion 430 and the icon 431 is associated with the user Bob. Icon 432 is also displayed in the section portion 430 and the icon 431 is associated with the user Mary. The check boxes 435 and 436 (which correspond to the user Bob and Mary respectively) are selected, indicating that conversation windows which contain comments from Bob or Mary should be displayed in the user interface 400 (e.g., conversation windows 471 and 522). The second portion 430 also includes a menu 439, which allows the list of users to be sorted based on different criteria (e.g., sort by most active user, sort by name of user, sort by most positive comments, etc.).

The third portion 440 includes a keyword 441 (e.g., "Economics") keyword 541 (e.g., "Statistical Analysis") and keyword 542 ("Regression"). The keyword 441 is obtained from the conversation window 417. The keywords 541 and 542 are obtained from the conversation window 522. The keywords 541 and 542 are related to the keyword 441 and lines or edges are shown between the keywords 441, 541 and 542 to show that the keywords 441, 541 and 542 are related or associated with each other.

As discussed above keywords 441, 541 and 542 may be keywords that appear in at least one of the content and a conversation window (e.g., conversation window 417, conversation window 522), or may be subjects or topics in a conversation window (e.g., the topics of conversation windows 417 and 522). In one embodiment, when the user selects a keyword, any conversation windows associated with the keyword may be highlighted. For example, when the user selects the keyword 542, any conversation windows which include the word "regression" or which discuss the topic of "regression" (e.g., conversation window 522) may be highlighted (e.g., the color of the conversation windows may change, the outline of the conversation windows may be bolded or colored, etc.).

In one embodiment, the keywords may include a metric indicating how popular a keyword is (e.g., keyword 441 has a metric of 3, keyword 541 has a metric of 1 and keyword 542 has a metric of 2). The metric may be based on at least one of the number of times that users have clicked on the keyword, the number of times the keyword appears in conversation windows and the number of times the keyword appears in the content of the electronic media item. For example, the keyword 542 appears twice in the conversation window 522 and a metric of "2" is displayed as part of the keyword 542.

Figure 6:
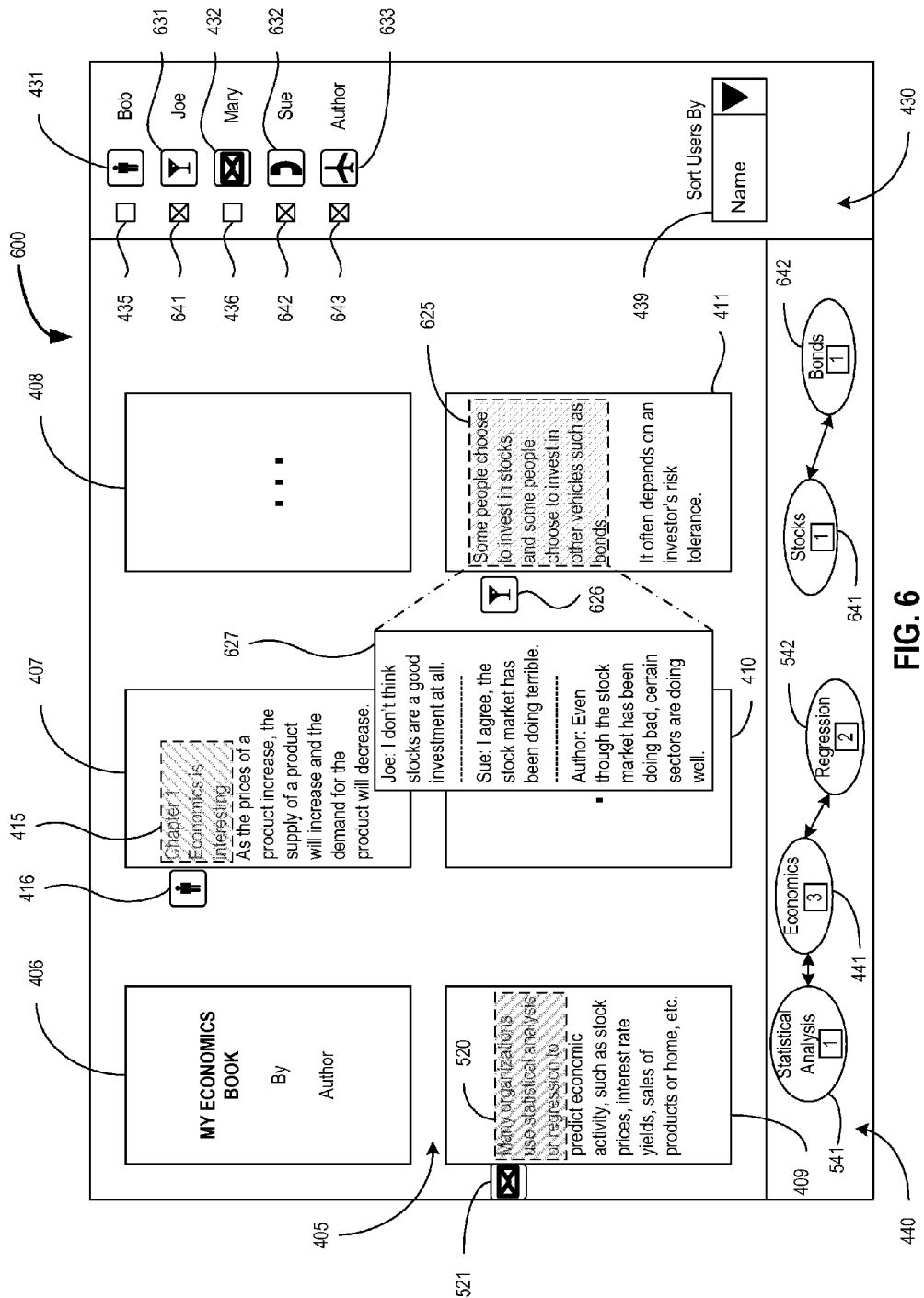
FIG. 6 a diagram illustrating a user interface according to a further embodiment.

FIG. 6 a diagram illustrating a user interface 600 according to a further embodiment. The user interface 600 is similar to the user interface 400 of FIG. 4 and the user interface 500 of FIG. 5. The user interface 600 includes a first portion 405, a second portion 430 and a third portion 440. The first portion 405 includes pages 406 through 411. Conversation windows 417 and 522 (which were shown in FIG. 5) have been minimized (e.g., the size of the conversation windows 417 and 522 have been reduced) and are no longer visible in the first portion 405. Although the conversations windows 417 and 522 are no longer visible in FIG. 6, in other embodiments, the conversation windows 417 and 522 may remain visible, but may be reduced in size. For example, the size of conversation windows 417 and 522 may be reduced such that only one line from the comments is displayed in the conversation windows 417 and 522).

In the user interface 600, Joe has selected section 625 of the content of the electronic media item. The section 625 is highlighted as shown in FIG. 6. Joe provides a comment associated with the highlighted section 625, which is received by a conversation management module. The comment provided by Joe (e.g., "I don't think stocks are a good investment at all.") is displayed in the conversation window 627, which is associated with the highlighted section 625. Icon 626, which is associated with Joe, is displayed next to the conversation window 627. Sue responds to Joe's comment by typing a comment or response in the conversation window 627 (e.g., "I agree, the stock market has been doing terrible."). Sue's comment is provided to the conversation management module which may provide Sue's comment to other user devices or users (e.g., to Bob, Mary, Joe and Author) by updating the conversation window 627 to include Joe's comment. The author of the electronic media item (e.g., "Author") responds to both Sue's comment and Joe's comment by providing a comment in the conversation window 627 (e.g., "Even though the stock market has been doing bad, certain sectors are doing well."). The Author's comments are provided to the conversation management module which may provide the Author's comments to other user devices or users (e.g., to Bob, Mary, Joe and Sue) by updating the conversation window 627 to include the author's comments.

As discussed above in conjunction with FIGS. 4 and 5, the second portion 430 of the user interface 400 includes a list of users who have provided comments on highlighted sections of content, displayed in the first portion 405. Icons 431, 432, 531, 532 and 533 are associated with the users Bob, Mary, Joe, Sue and the Author, respectively. The check boxes 435, 436, 541, 542 and 543 correspond to the users Bob, Mary, Joe, Sue and the Author, respectively. As shown in FIG. 6, checkboxes 641, 642 and 643 are selected (e.g., users Joe, Sue and the Author are selected). Because Bob and Mary are not selected, the conversation windows 471 and 522 (which contain comments from only Bob and Mary) are not displayed in the first portion (e.g., are minimized). Because Mary, Joe, Sue and the Author are selected, the conversation window 627 is displayed in the first portion 405. In one embodiment, the conversation windows 417 and 522 may be restored by selecting the icons 416 and 521 respectively. For example, a user may select the icon 416 (e.g., click on the icon 416) and the conversation window 417 may be restored to its original size (as shown in FIG. 4).

The third portion 440 includes a keyword 441 (e.g., "Economics") keyword 541 (e.g., "Statistical Analysis"), keyword 542 ("Regression"), keyword 641 ("Stocks") and keyword 642 ("Bonds"). The keyword 441 is obtained from the conversation window 417. The keywords 541 and 542 are obtained from the conversation window 522. The keywords 641 and 642 are obtained from the conversation window 627. The keywords 541 and 542 are related to the keyword 441 and lines or edges are shown between the keywords 441, 541 and 542 to show that the keywords 441, 541 and 542 are related or associated with each other. Keywords 641 and 641 are related or associated with each other, as indicated by the line or edge between the keywords 641 and 642.

As discussed above keywords 441, 541, 542, 641 and 642 may be keywords that appear in at least one of the content and a conversation window (e.g., conversation window 417, conversation window 522), or may be a subjects or topics in a conversation window (e.g., the topics of conversation windows 417 and 522). In one embodiment, when the user selects a keyword, any conversation windows associated with the keyword may be highlighted. For example, when the user selects the keyword 641, any conversation windows which include the word "stocks" or which discuss the topic of "stocks" (e.g., conversation window 627) may be highlighted (e.g., the color of the conversation windows may change, the outline of the conversation windows may be bolded or colored, etc.).

In one embodiment, the keywords may include a metric (which may be based on a relationship between the keyword and the content of the digital media item or the content of the conversation windows) indicating how popular a keyword is (e.g., keyword 441 has a metric of 3, keyword 541 has a metric of 1, keyword 542 has a metric of 2, etc.). The metric may be based on at least one of the number of times that users have clicked on the keyword, the number of times the keyword appears in conversation windows and the number of times the keyword appears in the content of the electronic media item.

Although the keyword metric is shown as a number displayed next to the keywords in FIGS. 4-6, in other embodiments, the keywords may have different highlighting, formatting, sizes and text colors, based on the keyword metric or based on the relationship between the keyword and the content of the digital media item or conversation windows. For example, each keyword may be highlighted a different color based on the keyword metric associated with the keyword (e.g., keywords with a keyword metric of 10 are highlighted red, keywords with a keyword metric of 9 are highlighted blue, etc.). In another example, the font size of the keyword may be based on the keyword metric (e.g., a keyword with a keyword metric of 12 has a font size of 12, etc.).

Figure 7:
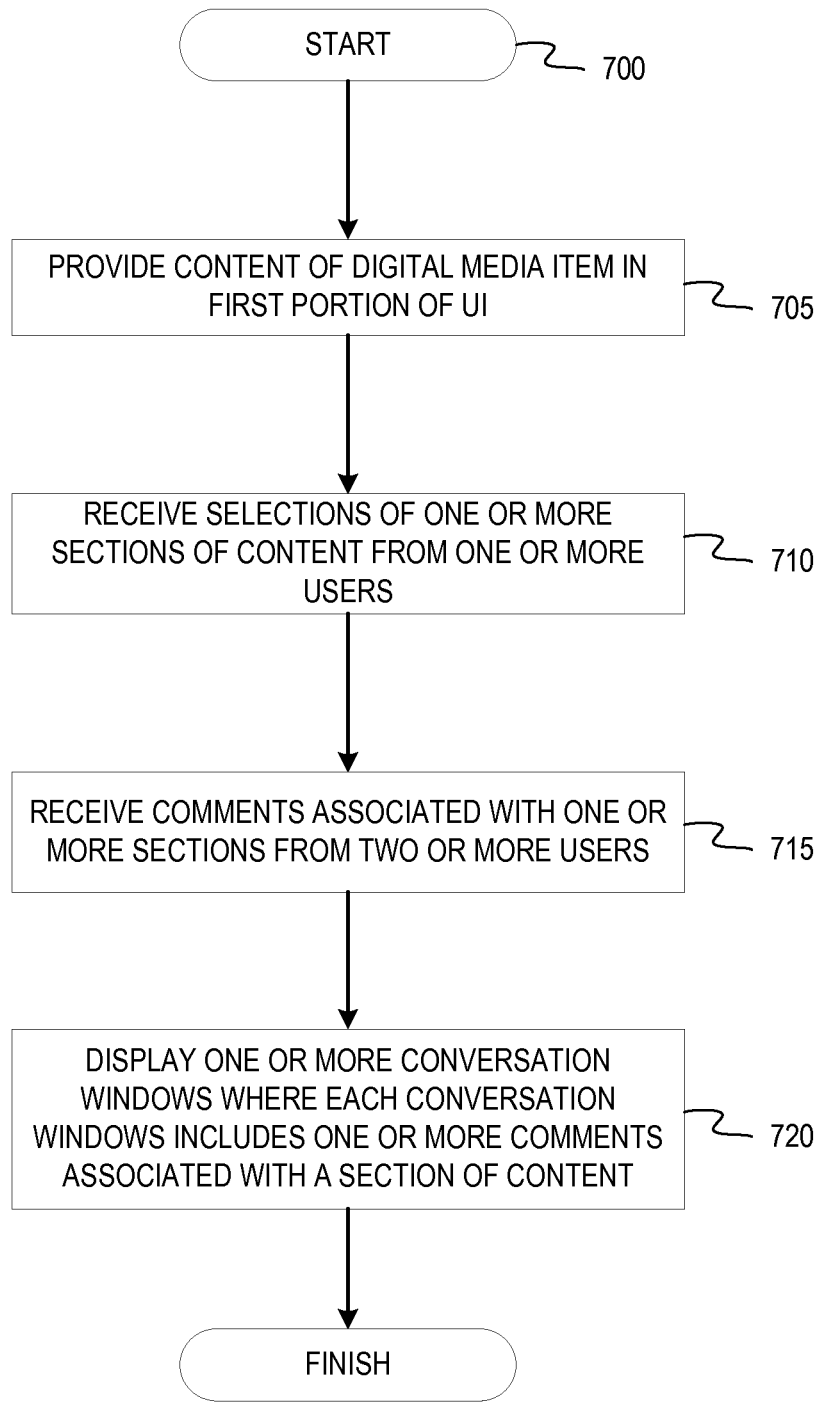
FIG. 7 is a flow diagram illustrating a method for managing conversations, according to an embodiment.
Figure 8:
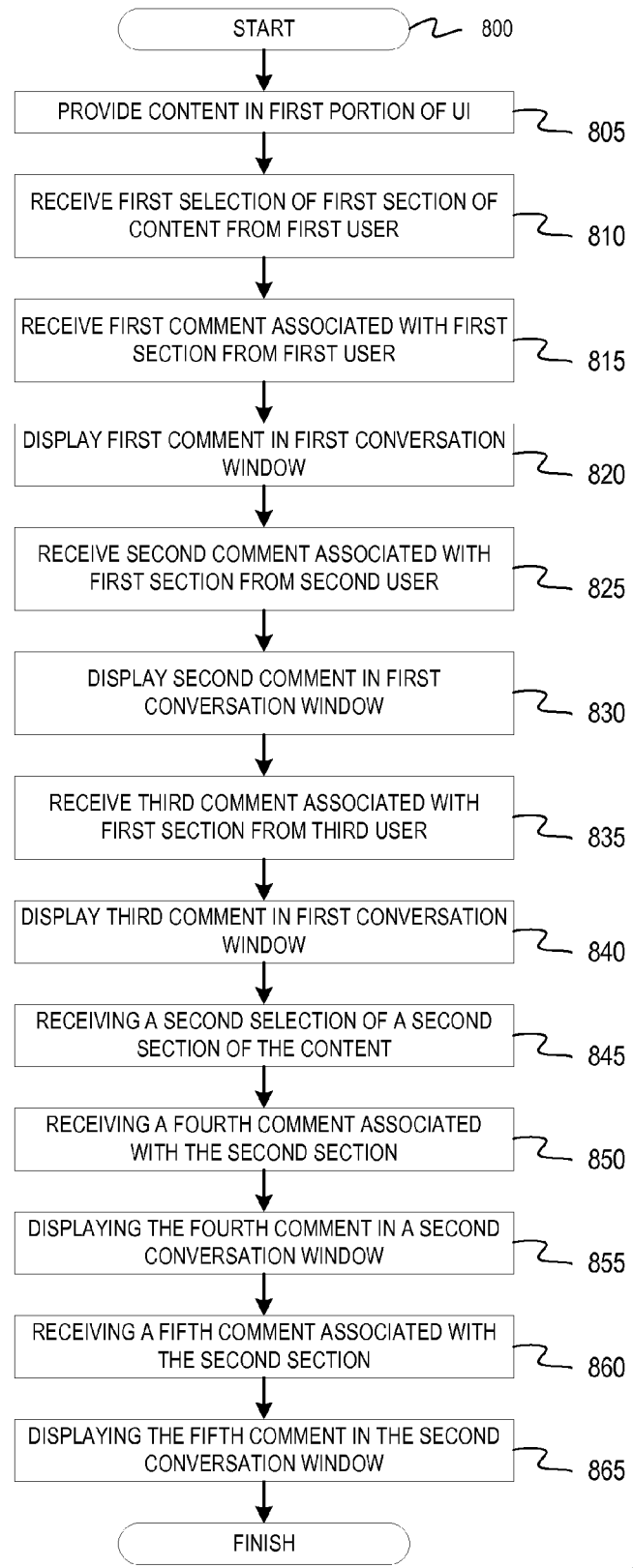
FIG. 8 is a flow diagram illustrating a more detailed method for managing conversations, according to an embodiment.
Figure 9:
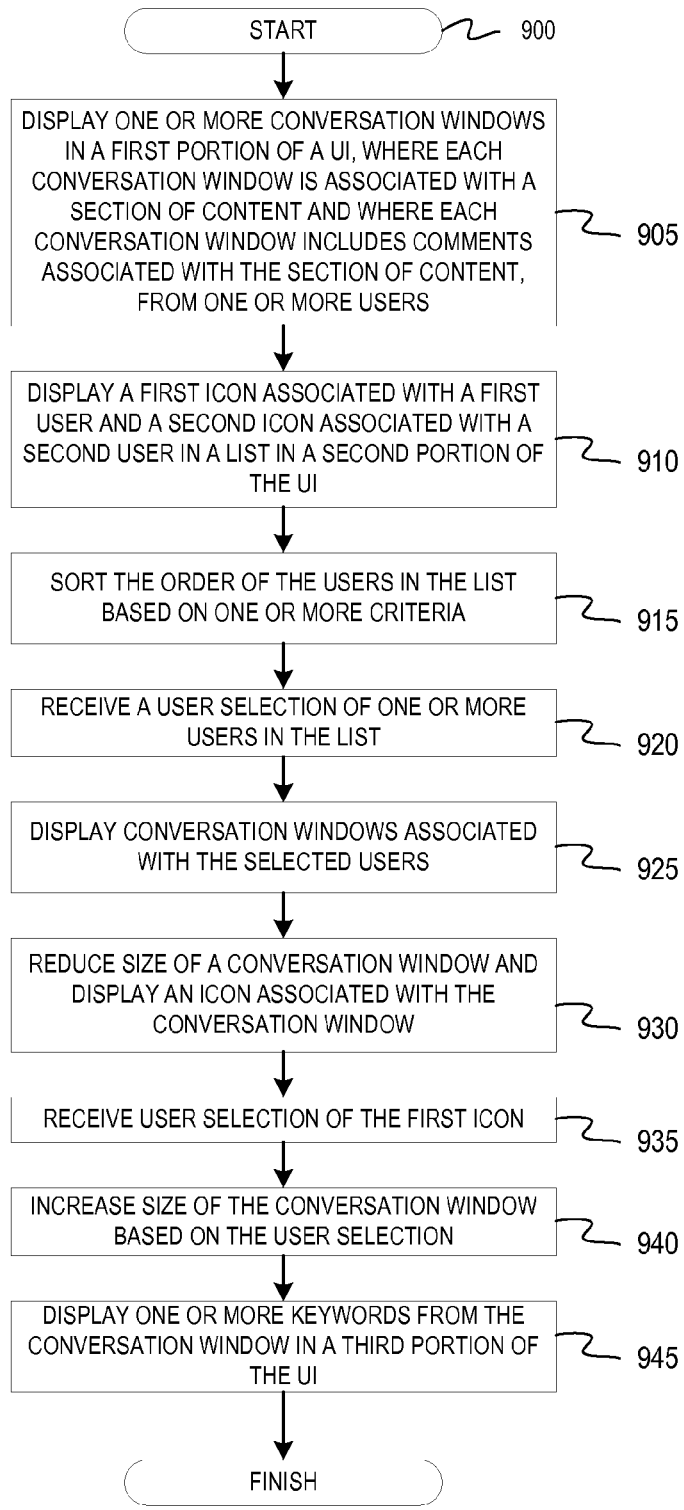
FIG. 9 is a flow diagram illustrating a method for managing conversations, according to another embodiment.

FIG. 7 through FIG. 9 illustrate methods for managing conversations related to content in an electronic media item. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. In one embodiment, the method is performed by a server (e.g., a web server or other server) or a user device (e.g., a laptop computer, a table computer, a smart phone, a PDA, an electronic reader, etc). Alternatively, the methods may be performed by a combination of a server machine and a client machine. For example, the operations of the methods may be divided between a client and server machine.

FIG. 7 is a flow diagram illustrating a method 700 for managing conversations, according to an embodiment. The method 700 may be performed by processing logic that comprises hardware (e.g., circuitry, dedicated logic, programmable logic, microcode, etc.), software (e.g., instructions run on a processor to perform hardware simulation), or a combination thereof. The processing logic is configured to manage one or more conversations related to content in an electronic media item. In one embodiment, method 700 may be performed by one or more of a conversation management module and a conversation interface module, as shown in FIGS. 1 and 2.

Referring to FIG. 7, at block 705, method 700 provides content (e.g., text, images, charts, graphics, etc.) of an electronic media item in a first portion of a user interface (UI). For example, one or more pages of content are displayed in a first portion of a user interface, as shown in FIG. 6 (e.g., pages 401 through 411). At block 710, the method 700 receives one or more selections (e.g., highlights) of sections of content from one or more users. For example, one or more users may highlight a sentence or a portion of a page (e.g., content) as shown in FIG. 6 (e.g., highlighted or selected sections 415, 520, 625). In one embodiment, the selections of sections of content (e.g., the highlighting) may be received from a browser on a user device. In another embodiment, the selections of sections of content may be received from an application or a module, such as a conversation interface module, on the user device. At block 720, the method 700 displays one or more conversation windows in the first portion of the user interface. Each of the conversation windows includes one or comments associated with a section of content (e.g., a highlighted section of content). Each conversation window is also associated with a section of content. In one embodiment, the comments may be received from a browser on a user device. In another embodiment, the comments may be received from an application or a module, such as a conversation interface module, on the user device.

FIG. 8 is a flow diagram illustrating a more detailed method 800 for managing conversations, according to an embodiment. The method 800 may be performed by processing logic that comprises hardware (e.g., circuitry, dedicated logic, programmable logic, microcode, etc.), software (e.g., instructions run on a processor to perform hardware simulation), or a combination thereof. The processing logic is configured to manage one or more conversations related to content in an electronic media item. In one embodiment, method 800 may be performed by one or more of a conversation management module and a conversation interface module, as shown in FIGS. 1 and 2.

Referring to FIG. 8, at block 805, method 800 provides content (e.g., text, images, charts, graphics, etc.) of an electronic media item in a first portion of a user interface (UI) (e.g., portion 405 in FIG. 4). At block 810, the method 800 receives a first selection of a first section of the content (e.g., selection 415 as shown in FIG. 5). At block 815, the method 800 receives a first comment associated with the first section from the first user. At block 820 the method 800 displays the first comment in a first conversation window (e.g., Bob's first comment is displayed in conversation window 417 as shown in FIG. 5). At block 825, the method 800 receives a second comment associated with the first section of the content. At block 830, the method 800 displays the second comment in the first conversation window (e.g., Mary's first comment is displayed in conversation window 417 as shown in FIG. 5). At block 835, the method 800 receives a third comment associated with the first from a third user. At block 840, the method 800 displays the third comment in the first conversation window.

At block 845, the method 800 receives a second selection of a second section of the content. The second selection of a second section may be received from the first user, the second user, the third user, or a fourth user (e.g., selection 625 received from user Joe in FIG. 6). At block 850, the method 800 receives a fourth comment associated with the second section. At block 855, the method 800 displays the fourth comment in a second conversation window (e.g., Joe's first comment is displayed in conversation window 625 as shown in FIG. 6). At block 860, the method 800 receives a fifth comment associated with the second section. The fifth comment may be received from the first user, the second user, the third user, the fourth user, or a fifth user. At block 86, the method 800 displays the fifth comment in the second conversation window (e.g., Sue's first comment is displayed in conversation window 625 as shown in FIG. 6).

FIG. 9 is a flow diagram illustrating a method for managing conversations, according to another embodiment. The method 900 may be performed by processing logic that comprises hardware (e.g., circuitry, dedicated logic, programmable logic, microcode, etc.), software (e.g., instructions run on a processor to perform hardware simulation), or a combination thereof. The processing logic is configured to manage one or more conversations related to content in an electronic media item. In one embodiment, method 900 may be performed by one or more of a conversation management module and a conversation interface module, as shown in FIGS. 1 and 2.

Referring to FIG. 9, at block 905, the method 900 displays one or more conversation windows in a first portion of a UI. Each conversation window is associated with a section of content which has been selected by a user and each conversation window includes comments which are associated with the section of content. At block 910, the method 900 displays a first icon associated with a first user and a second icon associated with a second user, in a second portion of the UI (e.g., portion 430 of the interface 600 in FIG. 6). At block 915, the method 900 sorts the order of the users in the list based on one or more criteria (e.g., sorts the users by name or by number of comments received from the users).

At block 920, the method 900 receives a user selection of one or more users in the list (e.g., check boxes 641, 642 and 643 are selected in FIG. 6). At block 925, the method 900 displays conversation windows associated with the selected users (e.g., conversation window 627 is displayed because it is associated with Joe, Sue and the Author because Joe, Sue and the Author provided comments in the conversation window 627). At block 930, the method 900 reduces the size of a conversation window and displays a first icon associated with the conversation window. For example, as shown in FIG. 6, the conversation window 417 is minimized or reduced in size and the icon 416 is displayed. The icon 416 is associated with the highlighted section which is associated with the minimized conversation window 417.

At block 935, the method 900 receives a user selection of the first icon. At block 940, the method 900 increases the size of the conversation window (e.g., conversation window 417) associated with the first icon (e.g., icon 416). At block 945, the method 900 displays one or more keywords (e.g., keywords 441, 541, 542, 641 and 642) from the conversation window in a third portion of the UI (e.g., in the third portion 440 of FIGS. 4-6).

Figure 10:
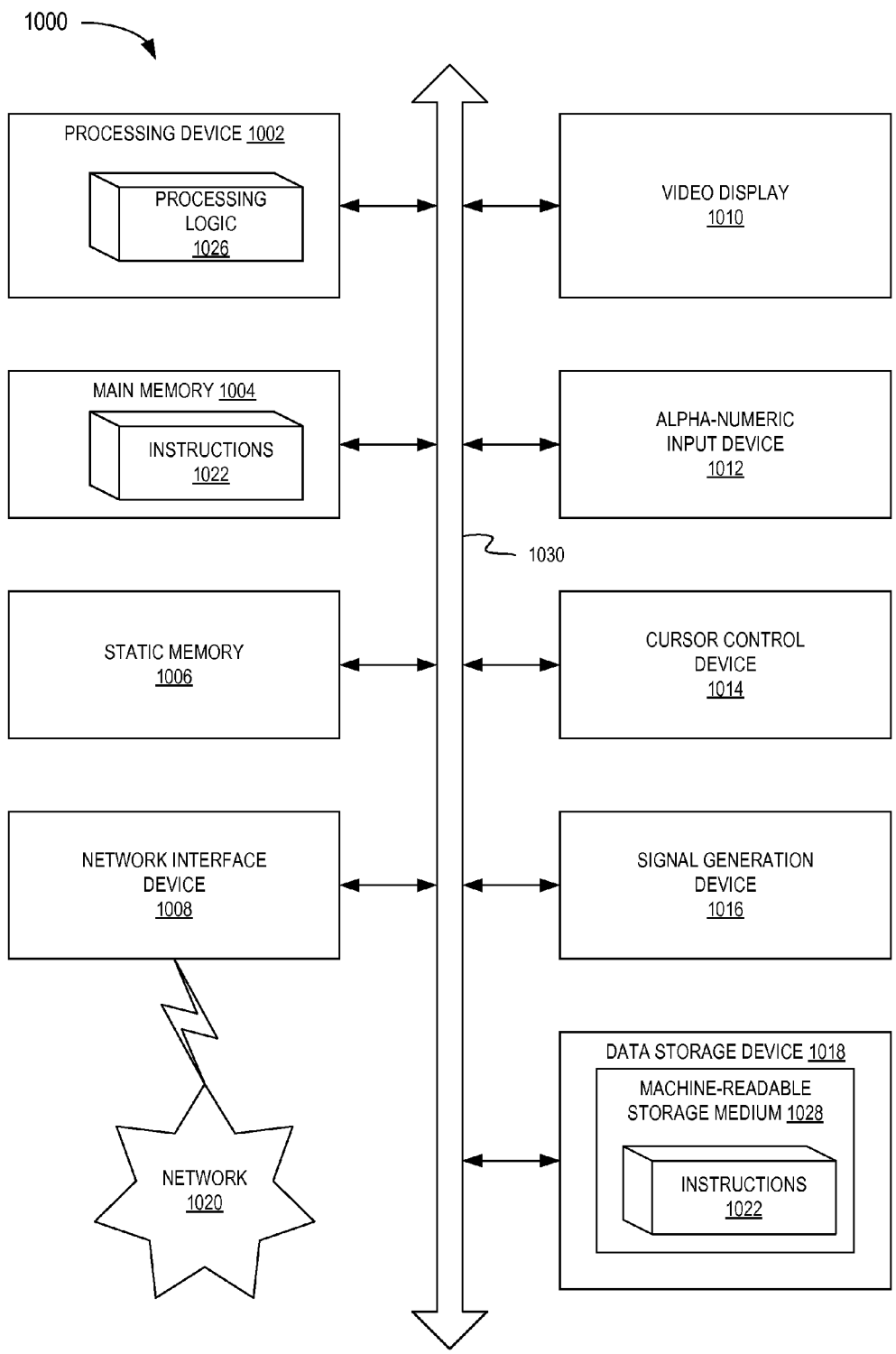
FIG. 10 is a block diagram illustrating one embodiment of a computer system, according to an embodiment.

FIG. 10 illustrates a diagrammatic representation of a machine in the exemplary form of a computer system 1000 within which a set of instructions, for causing the machine to perform any one or more of the methodologies discussed herein, may be executed. The system 1000 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, the exemplary computer system 100 may be a server in the digital content providing system, where a conversation management module resides. In another embodiment, the exemplary computer system 100 may be a user device where a browser or a conversation interface module resides.

The exemplary computer system 1000 includes a processing device (e.g., a processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)) and a data storage device 1018, which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute one or more of the conversation management module 127 and the conversation interface module 105 for performing the operations and steps discussed herein.

The computer system 1000 may further include a network interface device 1008 which may communicate with a network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and a signal generation device 1016 (e.g., a speaker).

The data storage device 1018 may include a computer-readable medium 1028 on which is stored one or more sets of instructions 1022 (e.g., instructions of the conversation management module 127 or the conversation interface module 105) embodying any one or more of the methodologies or functions described herein. The instructions 1022 may also reside, completely or at least partially, within the main memory 1004 and/or within processing logic 1026 of the processor 1002 during execution thereof by the computer system 1000, the main memory 1004 and the processor 1002 also constituting computer-readable media. The instructions may further be transmitted or received over a network 1020 via the network interface device 1008.

While the computer-readable storage medium 1028 is shown in an exemplary embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "providing,", "receiving," "displaying," "sorting," "decreasing," "increasing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
displaying a user interface with a first portion and a second portion, wherein the second portion is a separate portion of the user interface than the first portion of the user interface;
providing, in the first portion, content of a digital media item;
receiving, by the user interface, a plurality of comments associated with a first section of the content and a second section of the content;
displaying, in the first portion, a first conversation window with a first comment of the plurality of comments, wherein:
the first conversation window is associated with the first section of the content, and
the first conversation window comprises comments associated with the first section of the content;
displaying, in the first portion, a second conversation window with a second comment of the plurality of comments, wherein:
the second conversation window is associated with the second section of the content, and
the second conversation window comprises comments associated with the second section of the content;
identifying a first keyword from the plurality of comments for the first conversation window;

associating the first keyword with the first conversation window, wherein the first conversation window contains a first instance of the first keyword;

associating the first keyword with the second conversation window, wherein the second conversation window contains a second instance of the first keyword;

identifying a second keyword in a third conversation window, in the first section, or in the second section;

associating the first keyword with the second keyword;

displaying, in the second portion, a first graphical representation of the first keyword, wherein a display characteristic of the first graphical representation of the first keyword is based, at least in part, on a relationship of the first keyword to the content of the digital media item;

displaying, in the second portion, a second graphical representation of the second keyword, wherein a display characteristic of the second graphical representation of the second keyword is based, at least in part, on a relationship of the second keyword to the content of the digital media item;

displaying, in the second portion, a graphical connector representing the association between the first keyword that is identified for the first conversation window in the first portion of the user interface and the second keyword that is identified for the third conversation window for the first section or for the second section in the first portion of the user interface;

receiving user input indicating selection of the first graphical representation; and visually identifying, in the first portion, the first conversation window or the second conversation window that is associated with the first keyword.

2. The method of claim 1, wherein the display characteristic of the first graphical representation of the first keyword comprises one or more of:
   a background color of the first graphical representation of the first keyword,
   a text color of the first graphical representation of the first keyword,
   a size of the first graphical representation of the first keyword, and
   a formatting of the first graphical representation of the first keyword.

3. The method of claim 1, wherein the relationship of the first keyword to the content of the digital media item comprises one or more of:
   a number of times the first keyword appears in the content of the digital media item, and
   a number of times the first keyword appears in the first conversation window and the second conversation window.

4. The method of claim 1, wherein visually identifying in the first portion of the user interface the first conversation window or the second conversation window that is associated with the first keyword comprises one or more of:
   highlighting the first conversation window or the second conversation window that is associated with first keyword,
   flashing the first conversation window or the second conversation window that is associated with the first keyword, and
   outlining the first conversation window or the second conversation window that is associated with the first keyword.

5. The method of claim 1, further comprising displaying icons in a third portion of the user interface, wherein each icon is associated with a reviewer of the content.

6. A system comprising:
a memory configured to store a digital media item; and
a processing device configured to:
   display a user interface with a first portion and a second portion, wherein the second portion is a separate portion of the user interface than the first portion of the user interface;
   provide, in the first portion, content of the digital media item;
   receive, by the user interface, a plurality of comments from a plurality of reviewers of the content associated with a first section of the content and a second section of the content;
   display, in the first portion, a first conversation window with a first comment of the plurality of comments, wherein:
      the first conversation window is associated with the first section of the content, and
      the first conversation window comprises comments associated with the first section of the content;
   display, in the first portion, a second conversation window with a second comment of the plurality of comments, wherein:
      the second conversation window is associated with the second section of the content, and
      the second conversation window comprises comments associated with the second section of the content;
   identify a first keyword from the plurality of comments for the first conversation window;
   associate the first keyword with the first conversation window, wherein the first conversation window contains a first instance of the first keyword;
   associate the first keyword with the second conversation window, wherein the second conversation window contains a second instance of the first keyword;
   identifying a second keyword in a third conversation window, in the first section, or in the second section;
   associate the first keyword with the second keyword;
   display, in the second portion, a first graphical representation of the first keyword, wherein a display characteristic of the first graphical representation of the first keyword is based, at least in part, on a relationship of the first keyword to the content of the digital media item;
   display, in the second portion, a second graphical representation of the second keyword, wherein a display characteristic of the second graphical representation of the second keyword is based, at least in part, on a relationship of the second keyword to the content of the digital media item; and
   display, in the second portion, a graphical connector representing the association between the first keyword that is identified for the first conversation window in the first portion of the user interface and the second keyword that is identified for the third conversation window, for the first section, or for the second section in the first portion of the user interface.

7. The system of claim 6, wherein the processing device is further configured to:
   receive input from the user interface of the system indicating selection of the first graphical representation from a plurality of graphical representations; and
   visually identify, in the first portion, the first conversation window or the second conversation window that is associated with the first keyword.

8. The system of claim 7, wherein visually identifying, in the first portion, the first conversation window or the second conversation window that is associated with the first keyword comprises one or more of:
- highlighting the first conversation window or the second conversation window that is associated with the first keyword,
- flashing the first conversation window or the second conversation window that are associated with the first keyword, and
- outlining the first conversation window or the second conversation window that is associated with the first keyword.

9. The system of claim 6, wherein the display characteristic of the first graphical representation of the first keyword comprises one or more of:
- a background color of the first graphical representation of the first keyword,
- a text color of the first graphical representation of the first keyword,
- a size of the first graphical representation of the first keyword, and
- a formatting of the first graphical representation of the first keyword.

10. The system of claim 6, wherein:
the display characteristic of the graphical representation of the first keyword is based, at least in part on, a keyword metric for the first keyword, and
the display characteristic of the graphical representation of the second keyword is based, at least in part on, the keyword metric for the second keyword;
the keyword metric is based on one or more of:
- a number of times the first keyword appears in the content of the digital media item, and
- a number of times the first keyword appears in the first conversation window and the second conversation window.

11. The system of claim 6, wherein the processing device is further configured to display a list of reviewers of the content in a third portion of the user interface, wherein each reviewer is associated with at least one of the plurality of comments and wherein each reviewer in the list of reviewers is associated with at least one of the first conversation window or the second conversation window.

12. The system of claim 11, wherein the processing device is further configured to:
receive, by the user interface, a selection of one or more reviewers in the list of reviewers; and
identify at least one of the first conversation window or the second conversation window associated with the selected one or more reviewers.

13. The system of claim 6, wherein the processing device is further configured to:
reduce a size of the second conversation window;
display, in the first portion, a first icon associated with the second conversation window;
receive a selection of the first icon; and
increase the size of the second conversation window based on the selection of the first icon.

14. A non-transitory computer-readable storage medium storing instructions which, when executed, cause a processing device to perform operations comprising:
displaying a user interface with a first portion and a second portion, wherein the second portion is a separate portion of the user interface than the first portion of the user interface;
providing, in the first portion, content of a digital media item in a first portion of the user interface;
receiving, by the user interface, a plurality of comments associated with the content from a plurality of reviewers of the content;
displaying, by the processing device, a first conversation window with a first comment in the first portion of the plurality of comments, wherein:
the first conversation window is associated with a first section of the content, and
the first conversation window comprises comments associated with the first section of the content;
displaying, in the first portion, a second conversation window with a second comment of the plurality of comments, wherein:
the second conversation window is associated with a second section of the content, and
the second conversation window comprises comments associated with the second section of the content;
identifying a first keyword from the plurality of comments for the first conversation window;
associating the first keyword with first conversation window, wherein the first conversation window contains a first instance of the first keyword;
associating the first keyword with the second conversation window, wherein the second conversation window contains a second instance of the first keyword;
identifying a second keyword in a third conversation window, in the first section, or in the second section;
associating the first keyword with the second keyword;
displaying, in the second portion, a first graphical representation of the first keyword, wherein a display characteristic of the first graphical representation of the first keyword is based on a keyword metric for the first keyword;
displaying, in the second portion, a second graphical representation of the second keyword, wherein a display characteristic of the second graphical representation is based on the keyword metric for the second keyword; and
displaying, in the second portion, a graphical connector representing the association between the first keyword that is identified for the first conversation window in the first portion of the user interface and the second keyword that is identified for the third conversation window, for the first section, or for the second section in the first portion of the user interface.

15. The non-transitory computer-readable storage medium of claim 14, wherein the operations further comprise:
receiving user input indicating selection of the first graphical representation; and
visually identifying, in the first portion, the first conversation window or the second conversation window that is associated with the first keyword.

16. The non-transitory computer-readable storage medium of claim 15, wherein visually identifying in the first portion the first conversation window or the second conversation window that is associated with the first keyword comprises one or more of:
- highlighting the first conversation window or the second conversation window that is associated with the first keyword,
- flashing the first conversation window or the second conversation window that is associated with the first keyword, and outlining the first conversation window or the second conversation window that is associated with the first keyword.

17. The non-transitory computer-readable storage medium of claim 14, wherein the display characteristic of the first graphical representation of the first keyword comprises one or more of:
- a background color of the first graphical representation of the first keyword,
- a text color of the first graphical representation of the first keyword,
- a size of the first graphical representation of the first keyword, and
- a formatting of the first graphical representation of the first keyword.

18. The non-transitory computer-readable storage medium of claim 14, wherein the keyword metric is based on one or more of:
- a number of times the first keyword appears in the content of the digital media item, and
- a number of times the first keyword appears in the first conversation window or the second conversation window.

19. The non-transitory computer-readable storage medium of claim 14, wherein the operations further comprise displaying a list of reviewers of the content in a third portion of the user interface, wherein each reviewer is associated with at least one of the plurality of comments and wherein each reviewer in the list of reviewers is associated with the first conversation window or the second conversation window.

20. The non-transitory computer-readable storage medium of claim 19, wherein the operations further comprise:
- receiving, by the user interface, a selection of one or more reviewers from the list of reviewers; and
- identifying at least one of the first conversation window or the second conversation window associated with the selected one or more reviewers.

21. The non-transitory computer-readable storage medium of claim 14, wherein the operations further comprise:
- reducing a size of the second conversation window;
- displaying, window in the first portion, a first icon associated with the second conversation;
- receiving a selection of the first icon; and
- increasing the size of the second conversation window based on the selection of the first icon.

* * * * *